Patented Jan. 12, 1932

1,841,184

UNITED STATES PATENT OFFICE

ARNOLD H. JOHNSON AND SAMUEL M. WEISBERG, OF BALTIMORE, MARYLAND, ASSIGNORS TO RESEARCH LABORATORIES OF NATIONAL DAIRY PRODUCTS CORPORATION, INC., OF BALTIMORE, MARYLAND, A CORPORATION OF MARYLAND

PROCESS OF TREATING MILK

No Drawing.   Application filed June 30, 1930.   Serial No. 465,056.

This invention relates to the treatment of milk and is particularly concerned with obtaining a uniform soft curd product, the digestibility of which will make it suitable for infant consumption.

It has been determined that milk, particularly raw milk, having a low curd tension can be fed to delicate infants without modification, and it is the province of this invention to produce such a product.

Physicians prefer milk from a mixed herd for the feeding of infants, and it is fundamental that the curd from different cows will possess a varied tension.

This invention aims to obtain, in a mixture of milk from different cows, a uniform curd tension in which the curd will be sufficiently softened to adapt it for feeding to the stomach of the most delicate infant. Heretofore, efforts have been made to soften the curd of milk by boiling, or in some cases by the addition of limewater, but these have proven unsatisfactory, and to some extent the modification of the raw milk based on rendering the curd softer when coagulated in the child's stomach has not produced a reliable solution to the problems of infant feeding.

The object of the present invention is, therefore, to adjust the milk in accordance with its curd tension, to so reduce the tension as to provide an acceptable soft curd product which will have the condition of its protein content undisturbed, and wherein the fatty phase of the milk is so adjusted that the tension is made uniform without any possibility of subsequent hardening of the curd, or resultant stringy or rubbery characteristics.

In carrying out the invention, the milk, preferably raw, is tested to determine its curd tension. This tension has been found to vary anywhere from 16 to 160 grams. Of course, with milk having a curd tension within the range of 16 to 45 grams, it is seldom necessary to soften the curd by modification or otherwise. Where, however, the curd tension is considered too high for proper digestion by an infant, it is necessary that the tension be reduced. For instance, milk having a tension above 45 grams may prove difficult of digestion in the stomach of a delicate infant, and must be treated to soften the curd.

The problem becomes more difficult where milk from different cows is mixed, and, as stated, such a mixture is desired by the medical profession. Under the circumstances, where the milk is from different cows, and different herds, the curd tension of the milk from the various animals has been found to vary within wide limits. This result, of course, affects the curd tension of the entire mixture and the milk must be treated to produce a uniform soft curd. For example, the milk from one cow may have a tension of 45 grams, while that from another will have a tension of 125 grams. The mixture will disclose such a hard curd as to be undesirable for feeding purposes without treatment.

In accordance with the present invention, it is proposed to treat the raw milk having a hard curd or a curd of high tension, to reduce the tension and provide an acceptable soft curd milk. It is proposed to do this with raw milk from the individual cow or with a mixture from several cows or herds.

In the treatment, the protein constituents of the milk are nowise affected, and the curd tension is lowered by acting primarily on the fatty phase of the milk.

To this end the raw milk, pasteurized milk or reconstituted milk, is subjected to homogenization in any suitable apparatus for this purpose, and the pressure employed in the homogenizing machine will vary with the tension of the curd as developed by test, and the desired final tension or softness characteristic of the product to be made.

The invention may be practiced upon skim milk which has been reconstituted so as to contain sufficient fat, substantially 4%, and it may likewise be employed with skim milk in which the fat content has been replaced by a mineral oil such as Nujol.

The homogenizing pressures employed have varied from 100 pounds upward, but pressures between 1000 pounds to 4500 pounds are preferable, and in each case the result has been the production of a uniform, soft, curd milk. Higher pressures up to 15,000 pounds could, of course, be employed, where necessary. That is, by homogenization of the milk, the ultimate curd tension is so reduced as to result in uniform soft curd, acceptable for the feeding of infants without further modification or treatment.

It will be understood that the method proceeds without any effect upon the proteins contained in the milk, but that the butter fat is broken up and more thoroughly distributed, effecting a uniform lowering of the curd tension. It appears that the butter fat is distributed as a thin layer on the surfaces of the proteins, or the proteins adhere to the fat, that is to say, the proteins are adsorbed into the fat water interface.

The ultimate product is one in which the fatty globules are in a finely sub-divided state, as distinguished from previous raw milk products wherein the curd tension was not satisfactorily adjusted, and there were present hard and rubbery solids which seriously interfered with the digestibility of the milk.

In accordance with the treatment by homogenization herein described, there is very little, if any, cream rise, but it will be understood that in some types of milk, it may be desirable at the conclusion of the process to remove top cream if the amount is substantial.

The value of this process to the milk producers will readily be understood, since it will enable milk from various cows or herds to be indiscriminately mixed and made to yield a uniform soft curd product. Heretofore, it was necessary to find a cow giving a soft curd milk and rely upon this source alone, while with the present invention the milk from cows giving a hard curd can be mixed or treated separately with but very little expense. By such a process moreover, it will be possible to more nearly meet the needs of the medical profession and enable infants to readily receive milk tested to have the proper curd tension without recourse to any modification or subsequent process such as boiling, or the addition of chemical compounds.

We have discovered that when homogenization pressures less than 3,000 lbs. are used, the curd has a tendency to resume its normal tension or hardness after approximately twenty-four hours. However, in the use of a homogenization pressure of 3,000 lbs. or better, we have discovered that the acquired softness is substantially permanent within the life of the milk.

The invention is applicable to pasteurized milk, but the process is preferably employed with milk which is not heated, since heat changes the condition of the calcium and some of the proteins.

The invention has been carried out at a temperature of 37° C. with very satisfactory results, and, of course, it is possible to heat the milk to higher ranges of temperature. If for any purpose it is found desirable to heat the milk at higher temperature, lower homogenization pressures could be used to obtain milks of permanent low curd tension.

The effect of homogenization appears to spread or finely distribute the fat as a thin layer on the surface of the protein material, without affecting in any way the proteins. That is to say, the proteins adhere to the fat and are adsorbed into the fat water interface. The fact that the proteins being in colloidal condition adhere to the fat water interface will insure the permanency of the soft curd tension obtained by my process. This is considered the mechanism by which the soft curd is obtained, since homogenization of skimmed milk has had no effect upon the curd tension unless the original fat content were replaced with butter fat or a mineral oil, as already described herein, or the skim milk otherwise reconstituted.

The product of the present invention coagulates or forms as a thin soft curd in the infant stomach, as distinguished from raw milks of hard curd tension which have not been so treated and wherein there forms an objectionable hard lump.

In accordance with our invention, a curd tension has been obtained as low as 8 grams, using pressures up to 5,000 pounds, from hard curd milks or mixtures of hard curd milks. We have successfully treated a large variety of milks and mixtures from various cows or herds and obtained soft curds having a tension below 45 grams or 60 grams as required.

In referring to curd tension herein, we mean curd tension as measured according to R. L. Hill in Bulletin 207, June, 1928, entitled "The physical curd character of milk and its relationship to the digestibility and food value of milk for infants," Utah Agricultural Experiment Station, Logan, Utah.

We claim:

1. The process of treating milk having hard curd to reduce the curd tension thereof and enhance its digestibility for the infant stomach which comprises homogenizing milk with pressures sufficient to break up and finely distribute the fatty phase and at a temperature sufficient that the fat content may be subdivided but not sufficient to cause precipitation or coagulation of the protein or precipitation of the calcium, to produce a soft curd milk having a permanent and uniform curd tension below 45 grams.

2. The process of treating a milk mixture composed of milk from different cows or herds individually possessing varying degrees of curd hardness to reduce the curd tension thereof and enhance its digestibility for the infant stomach which comprises homogenizing the milk mixture with pressure sufficient to break up and finely distribute the fatty phase and a temperature sufficient that the fat content may be subdivided but not sufficient to cause precipitation or coagulation of the protein or precipitation of the calcium, to produce a soft curd milk having the permanent and uniform curd tension below 45 grams.

In testimony whereof we have hereunto set our hands.

ARNOLD H. JOHNSON.
SAMUEL M. WEISBERG.